(12) United States Patent
Wallander

(10) Patent No.: US 12,715,184 B2
(45) Date of Patent: Aug. 25, 2026

(54) TIRE PATCHING KIT

(71) Applicant: Nuvalux LLC, Dallas, TX (US)

(72) Inventor: William Wallander, Dallas, TX (US)

(73) Assignee: Nuvalux LLC, Dallas, TX (US)

( * ) Notice: Subject to any disclaimer, the term of this patent is extended or adjusted under 35 U.S.C. 154(b) by 96 days.

(21) Appl. No.: 18/621,264

(22) Filed: Mar. 29, 2024

(65) Prior Publication Data

US 2025/0170789 A1 May 29, 2025

Related U.S. Application Data

(63) Continuation-in-part of application No. 18/521,091, filed on Nov. 28, 2023.

(60) Provisional application No. 63/554,403, filed on Feb. 16, 2024, provisional application No. 63/607,188, filed on Dec. 7, 2023.

(51) Int. Cl.

| | |
|---|---|
| ***B29C 73/08*** | (2006.01) |
| ***B21G 1/10*** | (2006.01) |
| ***B29C 73/02*** | (2006.01) |
| ***B29C 73/06*** | (2006.01) |
| ***B29C 73/16*** | (2006.01) |
| ***B29D 30/06*** | (2006.01) |
| ***B29L 30/00*** | (2006.01) |
| ***B60C 25/00*** | (2006.01) |

(52) U.S. Cl.

CPC .............. *B29C 73/08* (2013.01); *B60C 25/16* (2013.01); *B21G 1/10* (2013.01); *B29C 73/025* (2013.01); *B29C 73/06* (2013.01); *B29C 73/063* (2013.01); *B29C 73/066* (2013.01); *B29C 73/16* (2013.01); *B29D 30/0685* (2013.01); *B29L 2030/00* (2013.01)

(58) Field of Classification Search

CPC ....... B29C 73/08; B29C 73/025; B29C 73/06; B29C 73/063; B29C 73/066; B29C 73/16; B29L 2030/00; B60C 25/16; B21G 1/10; B29D 30/0685

See application file for complete search history.

(56) References Cited

U.S. PATENT DOCUMENTS

| | | | | |
|---|---|---|---|---|
| 6,202,510 | B1 | 3/2001 | Kupelian | |
| 6,382,019 | B1 | 5/2002 | Hendry | |
| 2017/0173899 | A1 * | 6/2017 | Schlegelmilch | B29C 73/14 |

FOREIGN PATENT DOCUMENTS

| | | | | |
|---|---|---|---|---|
| CN | 215040475 U | | 12/2021 | |
| CN | 114379122 A | * | 4/2022 | B29C 73/166 |

OTHER PUBLICATIONS

International Search Report and Written Opinion for PCT/US2024/045005; Dec. 16, 2024; 12 pages.

* cited by examiner

*Primary Examiner* — S. Behrooz Ghorishi
(74) *Attorney, Agent, or Firm* — Barnes & Thornburg LLP; Jerry C. Harris, Jr.

(57) ABSTRACT

A tire patching kit includes a cable configured to extend through a puncture in the tire and to extend through an opening formed between the tire and the rim without removing the tire from the rim. The kit also includes a plug configured to be positioned in the puncture, wherein the cable is movable to cause a plug stem to be pulled into the puncture so that a plug base positions against a surface of the interior of the tire.

10 Claims, 16 Drawing Sheets

206
200
204
202
210
220
222
18
16
90
208
252
12
14
18
76
74
70
84
28
26
22
24
28
230
80
72

206
200
204
202
210
220
208
250
76
74
84
72
80
28
70
26
22
24
28
230

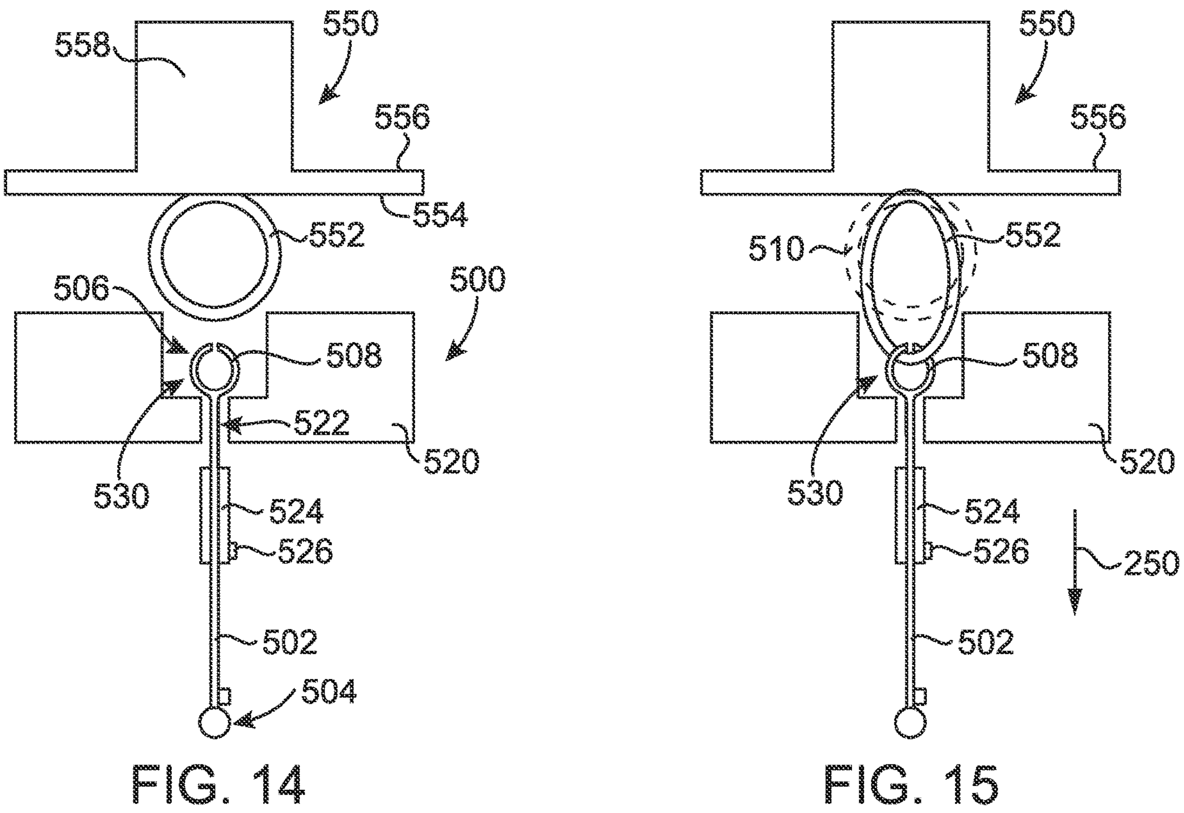
FIG. 14
FIG. 15
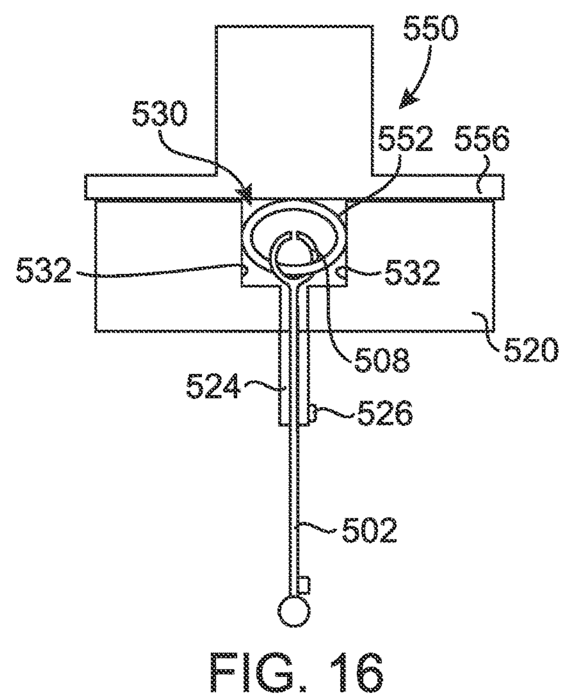
FIG. 16

200
204
206
14
12
558
520
220
556
208
230

TIRE PATCHING KIT

CROSS-REFERENCE TO RELATED APPLICATIONS

The present application is a continuation in part of U.S. patent application Ser. No. 18/521,091, filed Nov. 28, 2023, and claims priority to U.S. Provisional Patent Application Ser. No. 63/607,188, filed Dec. 7, 2023, and U.S. Provisional Patent Application Ser. No. 63/554,403, filed Feb. 16, 2024, each of which is incorporated herein by reference.

BACKGROUND

The present disclosure generally relates to a tire patching kit, and more particularly, to tire patching kit for patching a tire without removing the tire from a rim.

There are various systems available for patching a tire. One system includes a stick formed from tar, rubber, and/or fiber that is pushed into the tire puncture. Another system includes a rubber plug in the shape of a mushroom that is compressed and pushed into the tire. A third system includes rubber plugs that require the tire to be removed from the rim and are then pushed through the puncture from inside the tire. Each of these systems require installation by pushing the plug through and into the tire or they require that the tire must be completely removed from the rim and then patched from inside the tire. Without a hydraulic tire remover, tire removal from the rim can be very difficult.

SUMMARY

The present disclosure includes one or more of the features recited in the appended claims and/or the following features which, alone or in any combination, may comprise patentable subject matter.

According to a first aspect of the disclosed embodiments, a tire patching kit for patching a tire positioned on a rim is provided, wherein the tire has an interior and an exterior. The kit includes a cable having a first end and a second end. The cable is sized and shaped to extend through the tire such that the first end of the cable is configured to extend through a puncture in the tire and to extend through an opening formed between the tire and the rim without removing the tire from the rim. At least a portion of the second end is configured to remain exterior to the puncture when the first end of the cable has extended through the puncture. A plug has a plug stem that is sized and shaped to be positioned in the puncture. The plug is attachable to the first end of the cable. The second end of the cable is movable to cause the cable to move through the puncture to pull the plug into the interior of the tire through the opening between the tire and the rim. The second end of the cable is movable so that the plug stem is pulled from the interior of the tire toward the exterior of the tire into the puncture.

In some embodiments of the first aspect, the first end and the second end of the cable may include a magnetic material. The cable may be fed through the tire with a magnet coupled to the magnetic material. A handle may be configured to attach to the second end of the cable to assist in moving the cable through the puncture. The plug stem may include an attachment mechanism configured to couple to the first end of the cable.

Optionally, in the first aspect, a plug base may extend from the plug stem and may be sized and shaped to position flush against the surface of the interior of the tire. The plug base may include an adhesive material configured to adhere to the surface of the interior of the tire.

It may be desired, in the first aspect, that a cable insert tube may be configured to position in the puncture to assist in moving at least one of the cable or the plug stem through the puncture. The cable insert tube may include a channel extending between a first end and a second end of the cable insert tube. The cable may be sized and shaped to extend through the channel. The plug stem may be sized and shaped to extend through the channel. The cable insert tube may be removable from the puncture while the plug stem remains positioned in the puncture. An auger may be provided to prepare the puncture for receiving at least one of the plug or a cable insert tube.

In some embodiments of the first aspect, a surface prep component may have a prep stem and a prep base. The prep stem may be attachable to the first end of the cable before attaching the plug to the cable. The second end of the cable may be movable through the puncture to pull the surface prep component into the interior of the tire through the opening between the tire and the rim. The second end of the cable may be movable so that prep stem is pulled from the interior of the tire toward the exterior of the tire into the puncture and the prep base positions against the surface of the interior of the tire. The prep stem may be configured to couple to an actuator while the prep stem is positioned in the puncture. The actuator may be configured to move the surface prep component to move the prep base along the surface of the interior of the tire. The prep base may include at least one of an abrasive material, a compressed air device, a brush, a swab, a cloth, or an applicator to prepare the surface of the interior of the tire. The cable may be a first cable. The kit further may also include a second cable having a first end and second end. The second end of second cable may be configured to couple to the prep base of the surface prep component so that the second end of the second cable extends through the opening between the tire and the rim while the prep base is positioned against the surface of the interior of the tire. At least a portion of the first end of the second cable may remain exterior to the tire and rim when the second end of the second cable extends through the opening between the tire and the rim. The second cable may be configured to swivel relative to the prep base of the surface prep component. The second cable may be moveable to remove the surface prep component from the interior of the tire through the opening between the tire and the rim.

According to a second aspect of the disclosed embodiments, a tire patching kit for patching a tire positioned on a rim is provided, wherein the tire has an interior and an exterior. The kit includes a first cable having a first end and a second end. The first cable is sized and shaped to extend through the tire such that the first end of the first cable is configured to extend through a puncture in the tire and to extend through an opening formed between the tire and the rim without removing the tire from the rim. At least a portion of the second end is configured to remain exterior to the puncture when the first end of the cable has extended through the puncture. A second cable has a first end and second end. A surface prep component has a prep stem and a prep base. The prep stem is attachable to the first end of the first cable and the prep base is attachable to the second end of the second cable. The second end of the first cable is movable to cause the cable to move through the puncture to pull the surface prep component into the interior of the tire through the opening between the tire and the rim. The second end of the first cable is movable so that prep stem is pulled from the interior of the tire toward the exterior of the tire into the puncture and the prep base positions against the surface of the interior of the tire to smooth the surface of the interior of the tire. The first end of second cable is configured to extend through the opening between the tire and the rim while the prep base is positioned against the surface of the interior of the tire. After smoothing the surface of the interior of the tire, the first end of the second cable is moveable to remove the surface prep component from the interior of the tire through the opening between the tire and the rim. A plug has a plug stem and a plug base. The plug stem is sized and shaped to be positioned in the puncture and the plug base is not deformable to be inserted through the puncture. The plug is attachable to the first end of the first cable after removing the surface prep component from the first cable and repositioning the first cable so that the first end of the first cable extends through the puncture in the tire and extends through the opening formed between the tire and the rim so that at least a portion of the second end remains exterior to the puncture. The second end of the first cable is movable to cause the first cable to move through the puncture to pull the plug into the interior of the tire through the opening between the tire and the rim. The second end of the first cable is movable so that the plug stem is pulled from the interior of the tire toward the exterior of the tire into the puncture and the plug base positions against a surface of the interior of the tire.

According to a third aspect of the disclosed embodiments, a method of repairing a puncture in a tire positioned on a rim is provided, wherein the tire has an interior and an exterior. The method includes extending a first end of a cable through the puncture in the tire so that the first end of the cable extends through an opening formed between the tire and the rim without removing the tire from the rim. The method also includes attaching a plug to the first end of the cable. The method also includes moving a second end of the cable to cause the cable to move through the puncture to pull the plug into the interior of the tire through the opening between the tire and the rim. The method also includes moving the second end of the cable so that the plug is pulled from the interior of the tire toward the exterior of the tire into the puncture.

According to a fourth aspect of the disclosed embodiments, a tire patching kit for patching a tire positioned on a rim is provided, wherein the tire has an interior and an exterior. The kit includes a plug cable having a first end and a second end. The plug cable is sized and shaped to extend through the tire such that the first end of the plug cable is configured to extend through a puncture in the tire and to extend through an opening formed between the tire and the rim without removing the tire from the rim. At least a portion of the second end is configured to remain exterior to the puncture when the first end of the cable has extended through the puncture. A plug has a plug stem that is sized and shaped to be positioned in the puncture. A camera is provided to inspect an inner surface of the interior of the tire. The plug is attachable to the first end of the plug cable. The second end of the plug cable is movable to cause the plug cable to move through the puncture to pull the plug into the interior of the tire through the opening between the tire and the rim. The second end of the plug cable is movable so that the plug stem is pulled from the interior of the tire toward the exterior of the tire into the puncture.

In some embodiments of the fourth aspect, a camera cable may be provided. The camera may be attached to an end of the camera cable. The camera may be attached to at least one of the first end and the second end of the plug cable. The camera may be a wireless camera. The camera may be a Bluetooth camera.

According to a fifth aspect of the disclosed embodiments, a tire patching kit for patching a tire positioned on a rim is provided, wherein the tire has an interior and an exterior. The kit includes a plug cable having a first end and a second end. The plug cable is sized and shaped to extend through the tire such that the first end of the plug cable is configured to extend through a puncture in the tire and to extend through an opening formed between the tire and the rim without removing the tire from the rim. At least a portion of the second end is configured to remain exterior to the puncture when the first end of the cable has extended through the puncture. A plug has a plug stem that is sized and shaped to be positioned in the puncture. The plug has a plug base extending from the plug stem and configured to position against an interior surface of the tire. The plug stem is attachable to the first end of the plug cable. A compression block is configured to apply pressure against the plug base. The second end of the plug cable is movable to cause the plug cable to move through the puncture to pull the plug into the interior of the tire through the opening between the tire and the rim. The second end of the plug cable is movable so that the plug stem is pulled from the interior of the tire toward the exterior of the tire into the puncture while the compression block secures the plug base flush with the inner surface of the tire.

In some embodiments of the fifth aspect, a compression cable may attach to the plug base. The compression cable may be moveable to secure the compression block against the plug base. A cinching mechanism may be provided to hold the compression block in place against the plug base. The compression cable may attach to a loop coupled to the plug base. The compression cable may be movable to expand the loop against a bore of the compression block to secure the compression block to the plug base. The compression cable may include a releasable clamp that secures to the loop. The clamp may be actuated to release the compression cable from the loop. The compression block may be released from the plug base in response to actuating the clamp. The compression block and the compression cable may be removable from the interior of the tire after the plug is secured to the tire to seal the puncture.

According to a sixth aspect of the disclosed embodiments, a tire patching kit for patching a tire positioned on a rim is provided, wherein the tire has an interior and an exterior. The kit includes a plug cable having a first end and a second end. The plug cable is sized and shaped to extend through the tire such that the first end of the plug cable is configured to extend through a puncture in the tire and to extend through an opening formed between the tire and the rim without removing the tire from the rim. At least a portion of the second end is configured to remain exterior to the puncture when the first end of the cable has extended through the puncture. A plug has a plug stem that is sized and shaped to be positioned in the puncture. The plug has a plug base extending from the plug stem and configured to position against an interior surface of the tire. The plug stem is attachable to the first end of the plug cable. The plug base includes flanges to increase a rigidity of the plug base. The second end of the plug cable is movable to cause the plug cable to move through the puncture to pull the plug into the interior of the tire through the opening between the tire and the rim. The second end of the plug cable is movable so that the plug stem is pulled from the interior of the tire toward the exterior of the tire into the puncture.

In some embodiments of the sixth aspect, the flanges may extend radially outward from a center of the plug base to an outer perimeter of the plug base. The flanges may be configured to extend any distance between the center of the plug base and the outer perimeter of the plug base. The flanges may increase in thickness from the center of the plug base to the outer perimeter of the plug base.

According to a seventh aspect of the disclosed embodiments, a tire patching kit for patching a tire positioned on a rim is provided, wherein the tire has an interior and an exterior. The kit includes a bore tool coupled to a source of high pressure air. The bore tool includes openings that direct the high pressure air in the direction of an interior surface of the tire to clean the interior surface when the bore tool is extended through the puncture from the exterior of the tire. A plug cable has a first end and a second end. The plug cable is sized and shaped to extend through the tire such that the first end of the plug cable is configured to extend through a puncture in the tire and to extend through an opening formed between the tire and the rim without removing the tire from the rim. At least a portion of the second end is configured to remain exterior to the puncture when the first end of the cable has extended through the puncture. A plug has a plug stem that is sized and shaped to be positioned in the puncture. The plug has a plug base extending from the plug stem and configured to position against the interior surface of the tire. The plug stem is attachable to the first end of the plug cable. The second end of the plug cable is movable to cause the plug cable to move through the puncture to pull the plug into the interior of the tire through the opening between the tire and the rim. The second end of the plug cable is movable so that the plug stem is pulled from the interior of the tire toward the exterior of the tire into the puncture.

In some embodiments of the seventh aspect, the bore tool may be attachable to a source of compressed air. An air pump may be attachable to the bore tool to provide the high pressure air. The air pump may be attachable to a valve of the tire to inflate the tire. The air pump may inflate the tire with air at a lower pressure than the high pressure air.

Additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION

The detailed description particularly refers to the accompanying figures in which:

FIG. 14 illustrates a cross-sectional view of a compression system, in accordance with an embodiment.

FIG. 15 illustrates the loop in an expanded configured from providing tension on the cable.

FIG. 16 illustrates a compression block of the compression system positioned flush against a plug base of a plug.

DETAILED DESCRIPTION

Figure 1:
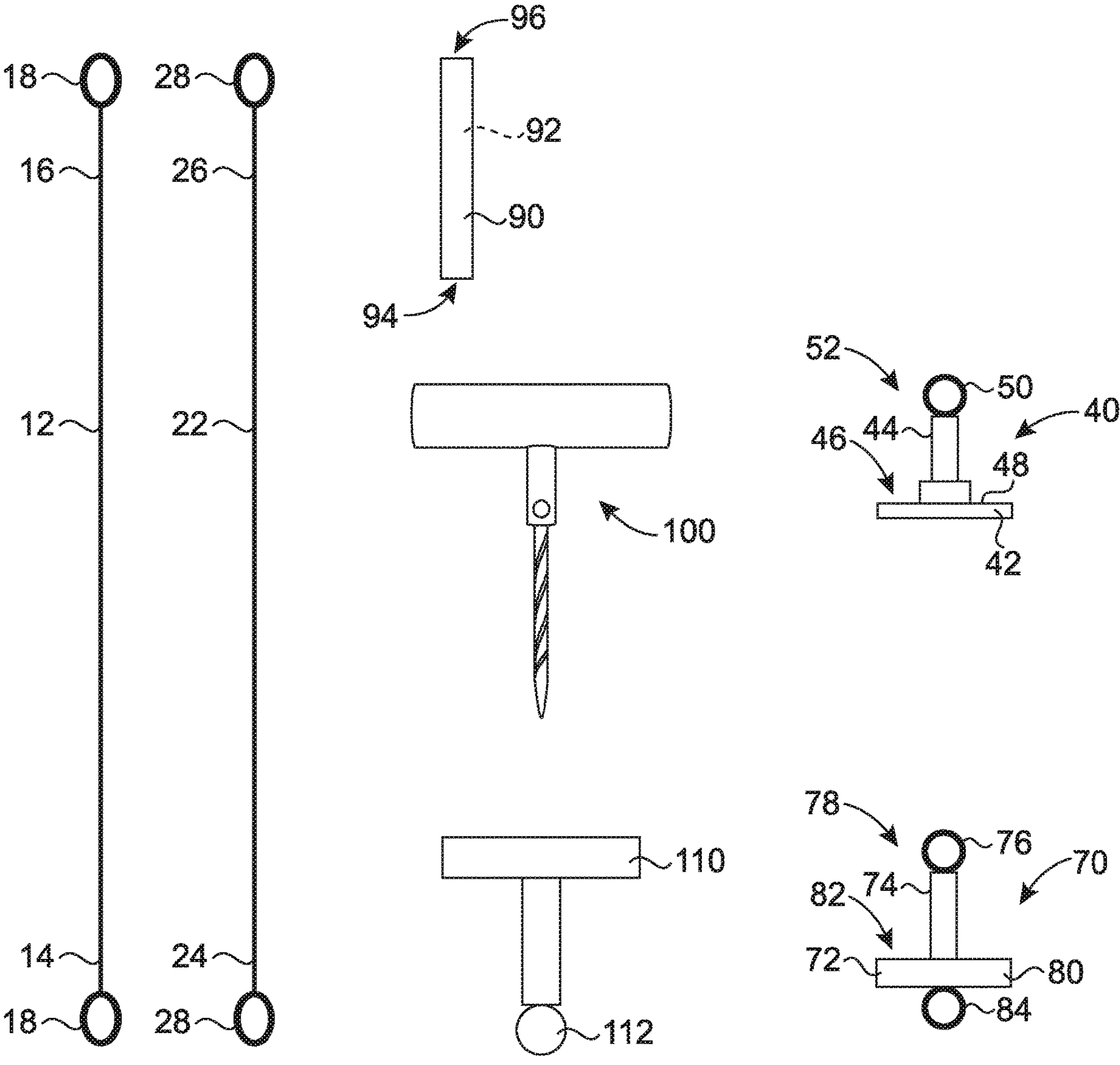
FIG. 1 illustrates a kit for patching a tire without entirely removing the tire from a rim.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a kit 10 for patching a tire without entirely removing the tire from a rim is provided. The kit 10 includes a first cable 12 having a first end 14 and a second end 16. It will be appreciated that, as used herein, the term "cable" refers to a wire, a rope, a string, a cord or another pulling device, whether flexible or inflexible, and of any material or structure. An attachment mechanism 18 is provided on each end 14, 16. In the illustrated embodiment, the attachment mechanism 18 is a loop. In other embodiments, the attachment mechanism 18 is a hook, a screw, a clip, a magnet, or another attachment mechanism suitable for attaching to the components of the kit 10 described herein. In some embodiments, at least one of the first end 14 and the second end 16 includes a magnetic material that enables the first cable 12 to be fed through the tire. The kit 10 also includes a second cable 22 having a first end 24 and a second end 26. An attachment mechanism 28 is provided on each end 24, 26. In the illustrated embodiment, the attachment mechanism 28 is a loop. In other embodiments, the attachment mechanism 28 is a hook, a screw, a clip, a magnet, or another attachment mechanism suitable for attaching to the components of the kit 10 described herein. In some embodiments, at least one of the first end 24 and the second end 26 includes a magnetic material that enables the second cable 22 to be fed through the tire.

A plug 40 is provided for being positioned in a puncture in the tire. The plug 40 is formed from any material suitable for patching a tire. For example, in some embodiments, the plug 40 is formed from rubber. The plug 40 has any suitable shape and size for plugging the puncture. It will be appreciated that, in some embodiments, the plug 40 is available in different shapes and sizes to accommodate patching different size punctures. For example, the kit 10, in some embodiments, includes different sized and shaped plugs 40. In other embodiments, different kits 10 include different sized and shaped plugs 40. The plug 40 is attachable to the first cable 12 and the second cable 22.

The plug 40 includes a plug base 42 and a plug stem 44 extending from the plug base 42. The plug base 42 is sized and shaped to position flush against an inner surface of the interior of the tire. The plug base 42 is available in different shapes and sizes, in some embodiments. That is, a kit 10 having multiple plugs 40 includes plugs 40 having different sized and shaped plug bases 42, in some embodiments. In other embodiments, different kits 10 include different sized and shaped plug bases 42. In an exemplary embodiment, the plug base 42 is not deformable to be inserted through the puncture. In some embodiments, the plug base 42 includes an adhesive material 46 configured to adhere to the surface of the interior of the tire. In such an embodiment, the adhesive material 46 is applied to the side 48 of the plug base 42 from which the plug stem 44 extends. In some embodiments, the plug base 42 includes a reinforcing material to ensure that the plug base 42 presses against the inner surface of the tire when the plug stem 44 is pulled through the puncture. In some embodiments, the reinforcing material includes finger ridges to press the plug base 42 onto the inner surface of the tire.

The plug stem 44 extends from the plug base 42. In the illustrated embodiment, the plug stem 44 is centered relative to the plug base 42. The plug stem 44 is sized and shaped to be positioned and secured in the puncture. The plug stem 44 is available in different shapes and sizes, in some embodiments. That is, a kit 10 having multiple plugs 40 includes plugs 40 having different sized and shaped plug stems 44, in some embodiments. In other embodiments, different kits 10 include different sized and shaped plug stems 44. The plug stem 44 includes an attachment mechanism 50 configured to secured to one of the first cable 12 or the second cable 22. The attachment mechanism 50 is positioned at a cantilevered end 52 of the plug stem 44 opposite the plug base 42. The attachment mechanism 50 is a stiff or flexible cable, a pin with a loop, a wire with a loop, a loop, a hook, a screw insert, a clip, or any other suitable mechanism for attaching to one of the attachments mechanisms 18, 28 of the respective cable 12, 22, in some embodiments.

A surface prep component 70 is provided for smoothing the inner surface of the tire before patching the tire with the plug 40. The surface prep component 70 includes a prep base 72 and a prep stem 74 extending from the prep base 72. In the illustrated embodiment, the prep stem 74 is centered relative to the prep base 72. The prep stem 74 is sized and shaped to extend through the puncture in the tire. The prep stem 74 includes an attachment mechanism 76 positioned on a cantilevered end 78 of the prep stem 74 opposite the prep base 72. In some embodiments, the attachment mechanism 76 is a loop, a hook, a screw, a clip, a magnet, or another attachment mechanism suitable for attaching to the attachments mechanisms 18, 28 of a respective cable 12, 22. The attachment mechanism 76 is also capable of attaching to an actuator, for example a drill, a socket wrench, or any other tool capable of moving the surface prep component 70 while the prep stem 74 of the surface prep component 70 is positioned in the puncture.

The prep base 72 includes an abrasive material 80 on the surface 82 of the prep base 72 from which the prep stem 74 extends. The abrasive material 80 is a brush or any material used to prepare the inner surface of the tire for patching by smoothing the inner surface. In some embodiments, the abrasive material 80 is a stone or mineral used for grinding, for example, sandpaper or diamond coating. In some embodiments, the prep base includes a compressed air tip with either forward flow for insertion inside the tire, or reverse flow for insertion through the puncture that, in either case, will blow compressed air onto the inner surface of the tire to assist in preparing the inner surface of the tire for installation of the plug 40. The prep base 72 includes a swivel attachment 84 extending from the side 86 of the prep base 72 opposite the prep stem 74 and the abrasive material 80. The swivel attachment 84 is attachable to one of the first cable 12 and the second cable 22 so that the respective cable 12, 22 can swivel while the actuator moves the surface prep component 70 to prevent tangling of the respective cable 12, 22.

The kit 10 also includes a cable insert tube 90 formed from any suitable material and having any suitable shape and size. The cable insert tube 90 is configured to be positioned in the puncture to assist in feeding the cables 12, 22 through the puncture. The cable insert tube 90 is available in different shapes and sizes to accommodate different sized punctures, in some embodiments. That is, a kit 10 having multiple cable insert tubes 90 includes cable insert tubes 90 having different sizes and shapes, in some embodiments. In other embodiments, different kits 10 include different sized and shaped cable insert tubes 90. The cable insert tube 90 is formed from any suitable material, for example, plastic. The cable insert tube 90 includes a channel 92 extending between a first end 94 and a second end 96 of the cable insert tube 90. The cables 12, 22 are sized and shaped to extend through the channel 92. The plug stem 44 and the prep stem 74 are also sized and shaped to extend through the channel 92.

In the illustrated embodiment, the kit 10 includes an auger 100 to prepare the puncture for receiving at least one of the plug stem 74 and the cable insert tube 90. The auger 100 is configured to smooth out the puncture and remove excess material from the puncture so that the other components of the kit 10 are insertable through the puncture. In the illustrated embodiment, the kit 10 also includes a handle 110 having an attachment mechanism 112 that is attachable to the respective attachment mechanisms 18, 28 of cables 12, 22 to assist in pulling the cables 12, 22 through the puncture.

Figure 2:
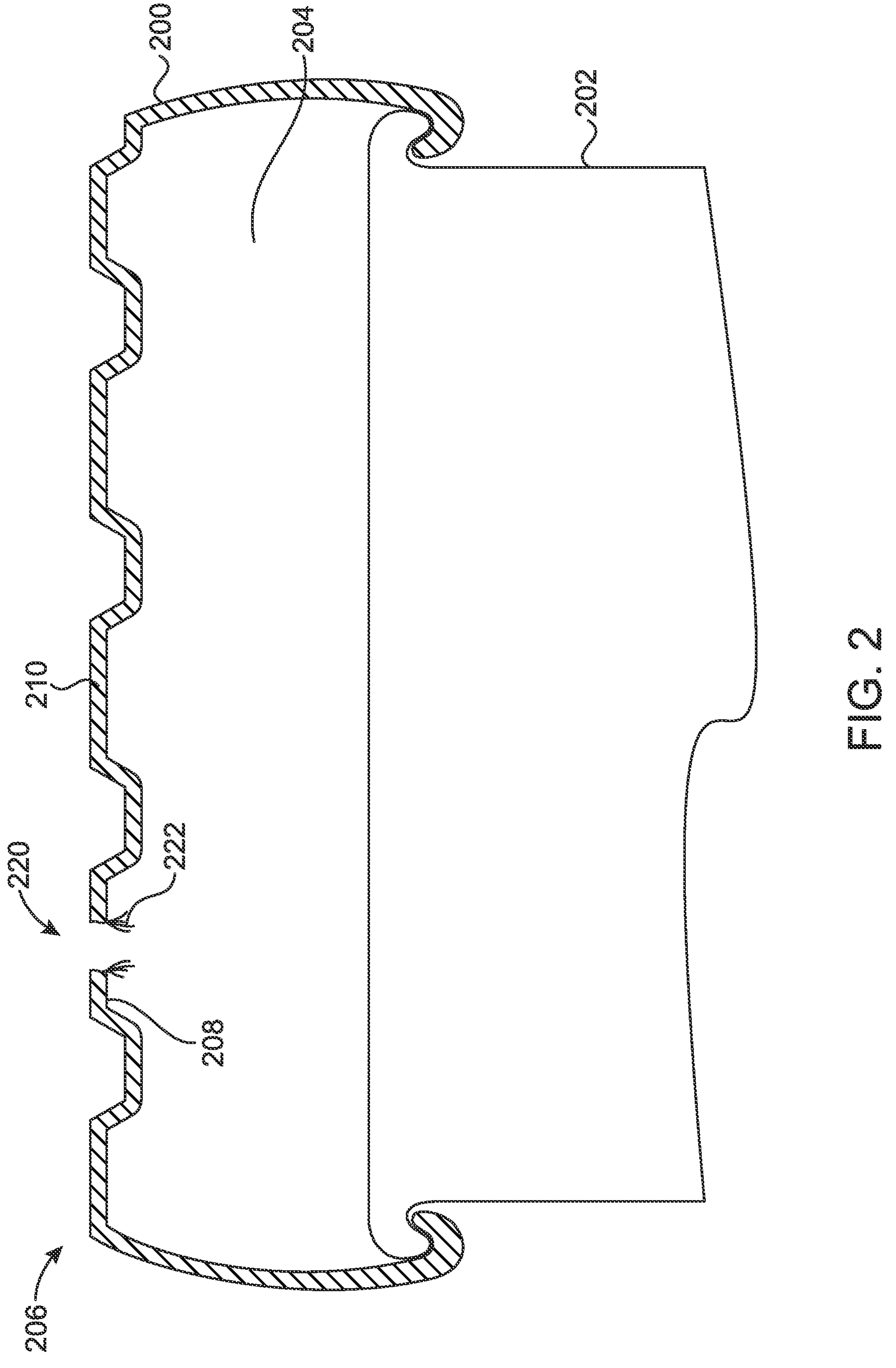
FIG. 2 illustrates a tire having a puncture formed in therein.

Referring to FIG. 2, a tire 200 is positioned on a rim 202 of a vehicle. In an exemplary embodiment, the vehicle is any vehicle having inflatable tires. In an exemplary embodiment, the tire 200 is formed from any suitable material, for example, rubber. The tire 200 includes an interior 204 between the tire 200 and the rim 202 and an exterior 206 opposite the interior 204. As used herein "interior" refers to any portion of the tire 200 configured to be filled with fluid, for example, air, and "exterior" refers to any area around the outside of the tire that is not filled with fluid. The interior 204 includes an inner surface 208, and the exterior 206 includes an exterior tread 210. The tire 200 illustrated in FIG. 2 has a puncture 220 formed in therein. In some embodiments, fragments 222 of tire material are formed around the puncture 210 on the inner surface 208.

Figure 3:
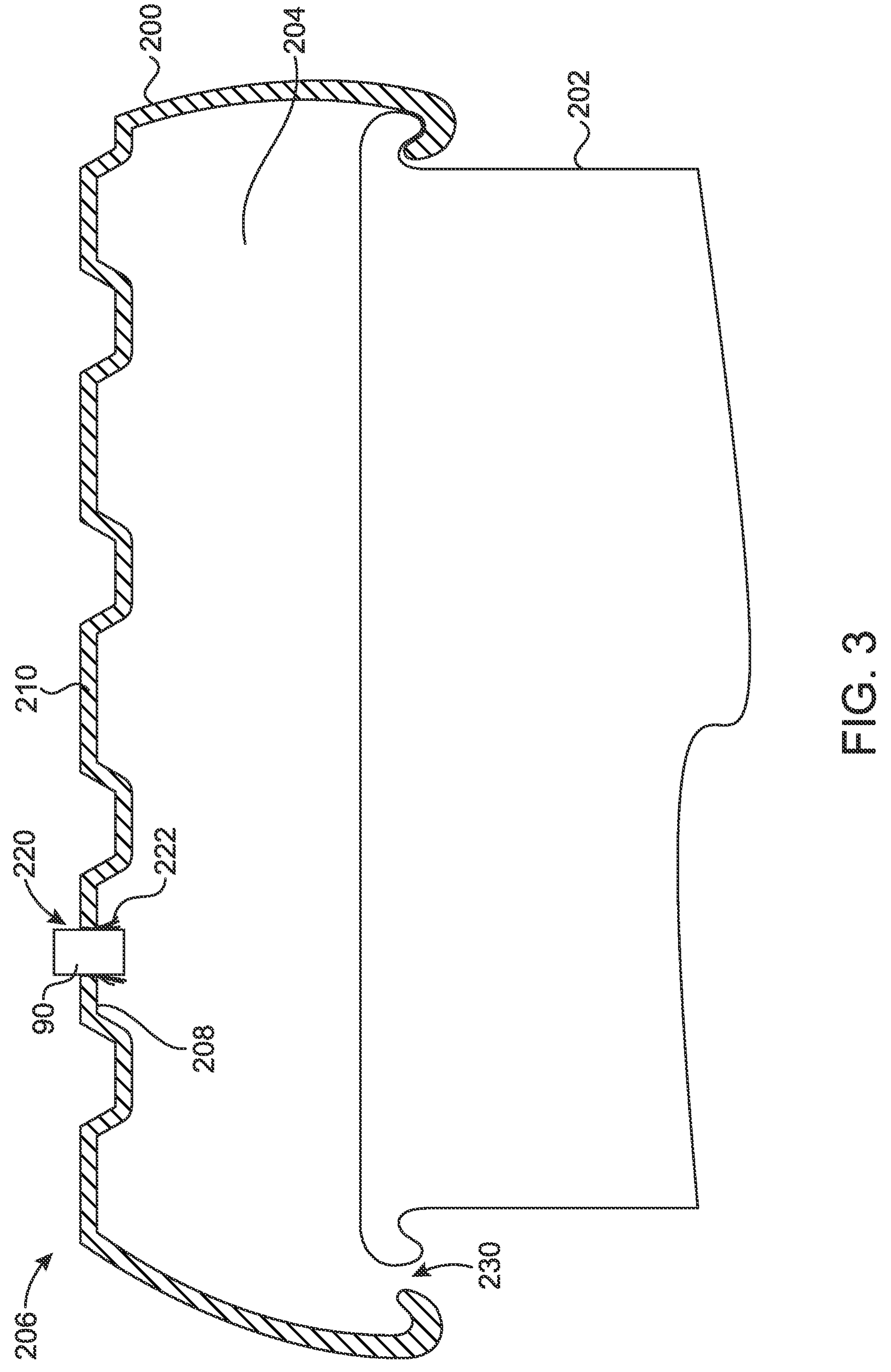
FIG. 3 illustrates the tire partially removed from the rim to form an opening between the tire and the rim, wherein a cable insert tube is positioned in the puncture.

FIGS. 3-11 illustrate a method for patching the puncture 220 in the tire 200 with the kit shown in FIG. 1. It will be appreciated that in the method illustrated in FIGS. 3-11, the first cable 12 and the second cable 22 are interchangeable. Referring now to FIG. 3, the tire 200 is partially removed from the rim 202 to form an opening 230 between the tire 200 and the rim 202. It will be appreciated that the method illustrated in FIGS. 3-11 does not require the tire 200 to be entirely removed from the rim 202. The cable insert tube 90 is positioned in the puncture 220 to assist in moving at least one of the cables 12, 22 and/or the plug stem 44 through the puncture 220. It will be appreciated that use of the cable insert tube 90 can be optional.

Figure 4:
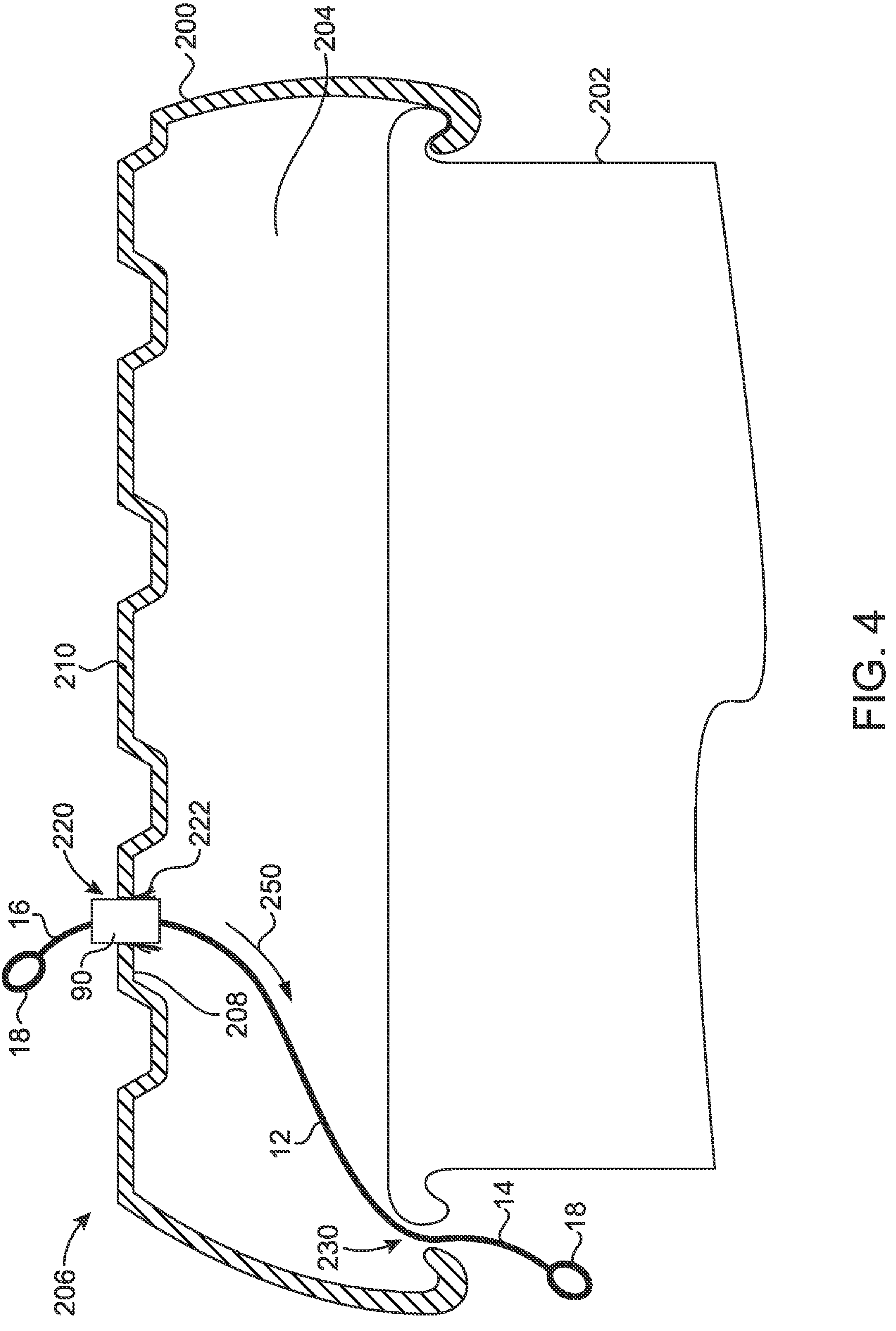
FIG. 4 illustrates a first cable fed through the cable insert tube and through the opening between the tire and the rim.

FIG. 4 illustrates the first cable 12 fed through the cable insert tube 90 and through the opening 230 between the tire 200 and the rim 202 in the direction of arrow 250. The first cable 12 is sized and shaped to extend through the tire 200 such that the first end 14 of the first cable 12 extends through the puncture 210 in the tire 200 and extends through the opening 230 formed between the tire 200 and the rim 202 without removing the tire 200 from the rim 202. In the illustrated embodiment, at least a portion of the first end 14 of the first cable 12 is positioned exterior to the opening 230. At least a portion of the second end 16 of the first cable 12 remains exterior to the puncture 220 when the first end 14 of the first cable 12 has extended through the puncture 220. In some embodiments, the first cable 12 is fed through the tire 200 from the puncture 220 to the opening 230 with a magnet that is attracted to the magnetic material on the first end 14 of the first cable 12.

Figure 5:
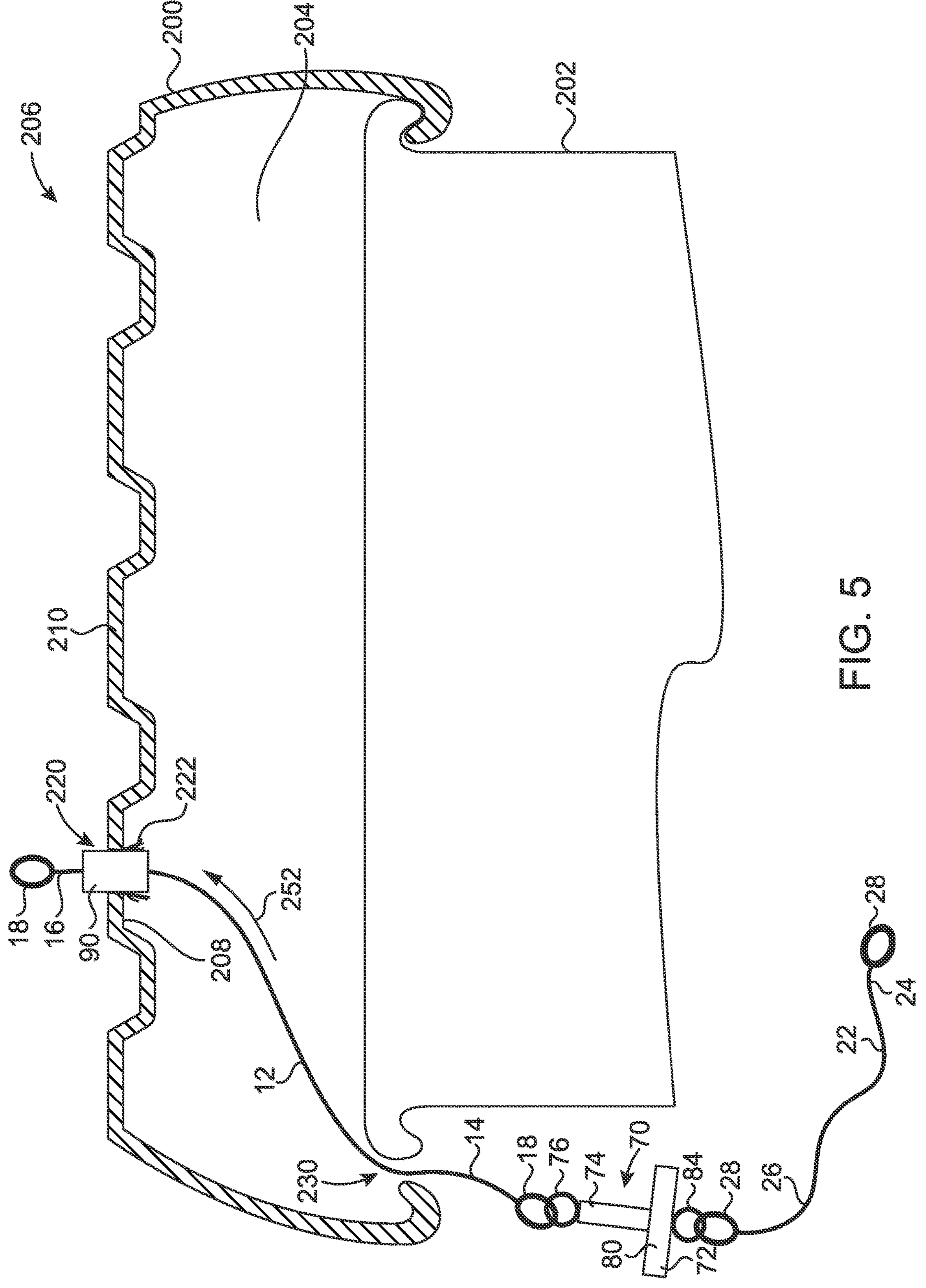
FIG. 5 illustrates a surface prep component coupled to the first end of the first cable and a second cable coupled to a prep base of the surface prep component, wherein the first cable is pulled to move the surface prep component through an interior of the tire and toward the puncture.

FIG. 5 illustrates the surface prep component 70 coupled to the first end 14 of the first cable 12. The prep stem 74 is attached to the first end 14 of the first cable 12 using the respective attachment mechanisms 76 and 18. The second cable 22 coupled to the prep base 72 of the surface prep component 70. The second end 26 of second cable 22 is coupled to the prep base 72 of the surface prep component 70 using the attachment mechanism 28 and the swivel attachment 84. The first cable 12 is pulled in the direction of arrow 252 to move the surface prep component 70 through the interior 204 of the tire 200 and toward the puncture 220.

Figure 6:
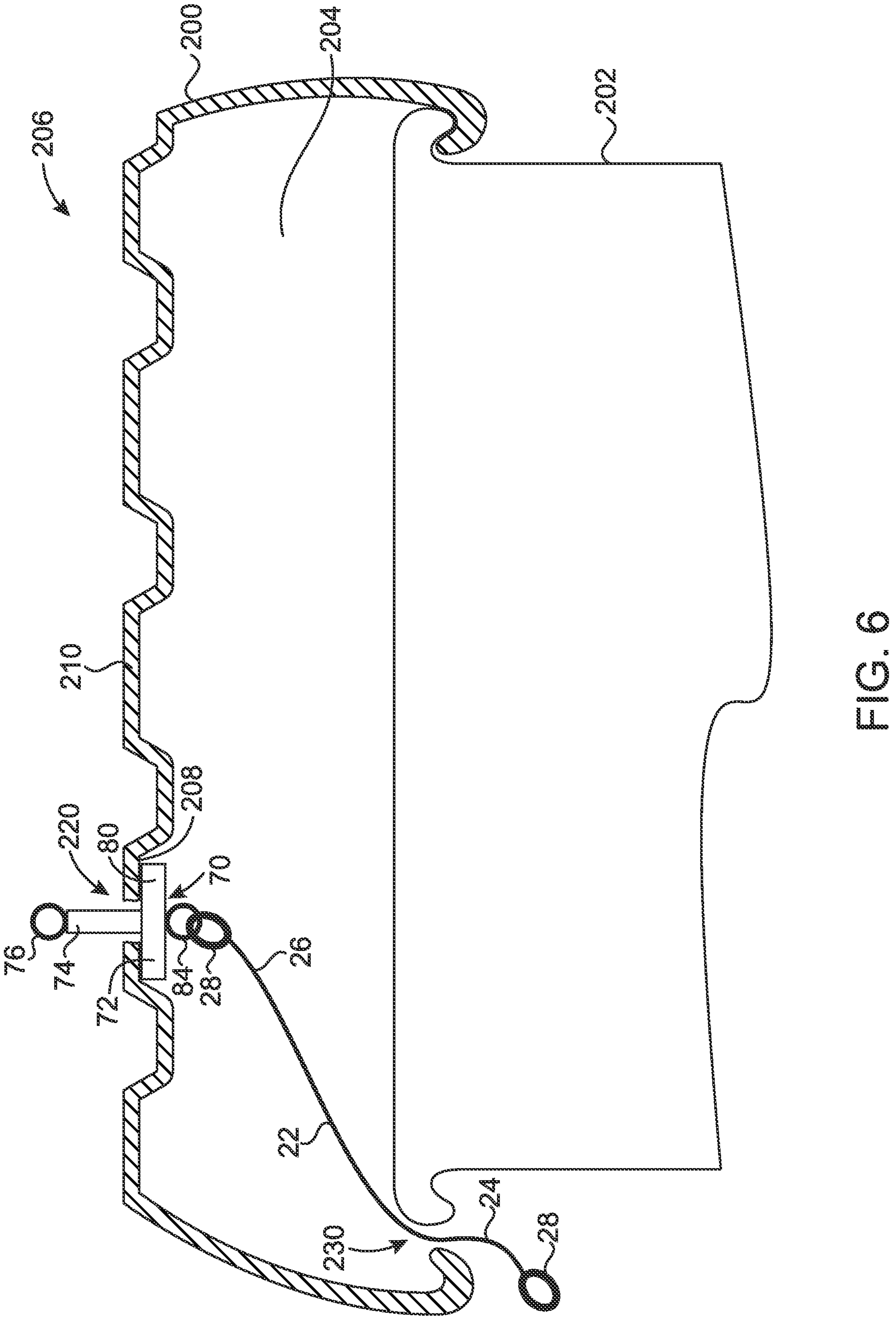
FIG. 6 illustrates a prep stem of the surface prep component pulled through the cable insert tube so that the prep base of the surface prep component is substantially flush against an inner surface of the tire.

Referring now to FIG. 6, the prep stem 74 of the surface prep component 70 is pulled through the cable insert tube 90 so that the prep base 72 of the surface prep component 70 is substantially flush against the inner surface 208 of the tire 200. The second end 16 of the first cable 12 is movable through the puncture 220 to pull the surface prep component 70 into the interior 204 of the tire 200 through the opening 230 between the tire 200 and the rim 202. The second end 16 of the first cable 12 is movable so that prep stem 74 is pulled from the interior 204 of the tire 200 toward the exterior 206 of the tire 200 into the puncture 220 and the prep base 72 positions against the inner surface 208 of the interior 204 of the tire 200. In some embodiments, the attachment mechanism 112 of the handle 110 is attached to the attachment mechanism 18 at the second end 16 of the first cable 12 so the handle 110 is usable to assist in moving the first cable 12 through the puncture 220. The second end 26 of the second cable 22 extends through the opening 230 between the tire 200 and the rim 202 while the prep base 72 is positioned against the inner surface 208 of the interior 204 of the tire 200. At least a portion of the first end 24 of the second cable 22 remains exterior to the tire 200 and rim 202 when the second end 24 of the second cable 22 extends through the opening 230 between the tire 200 and the rim 202.

Figure 7:
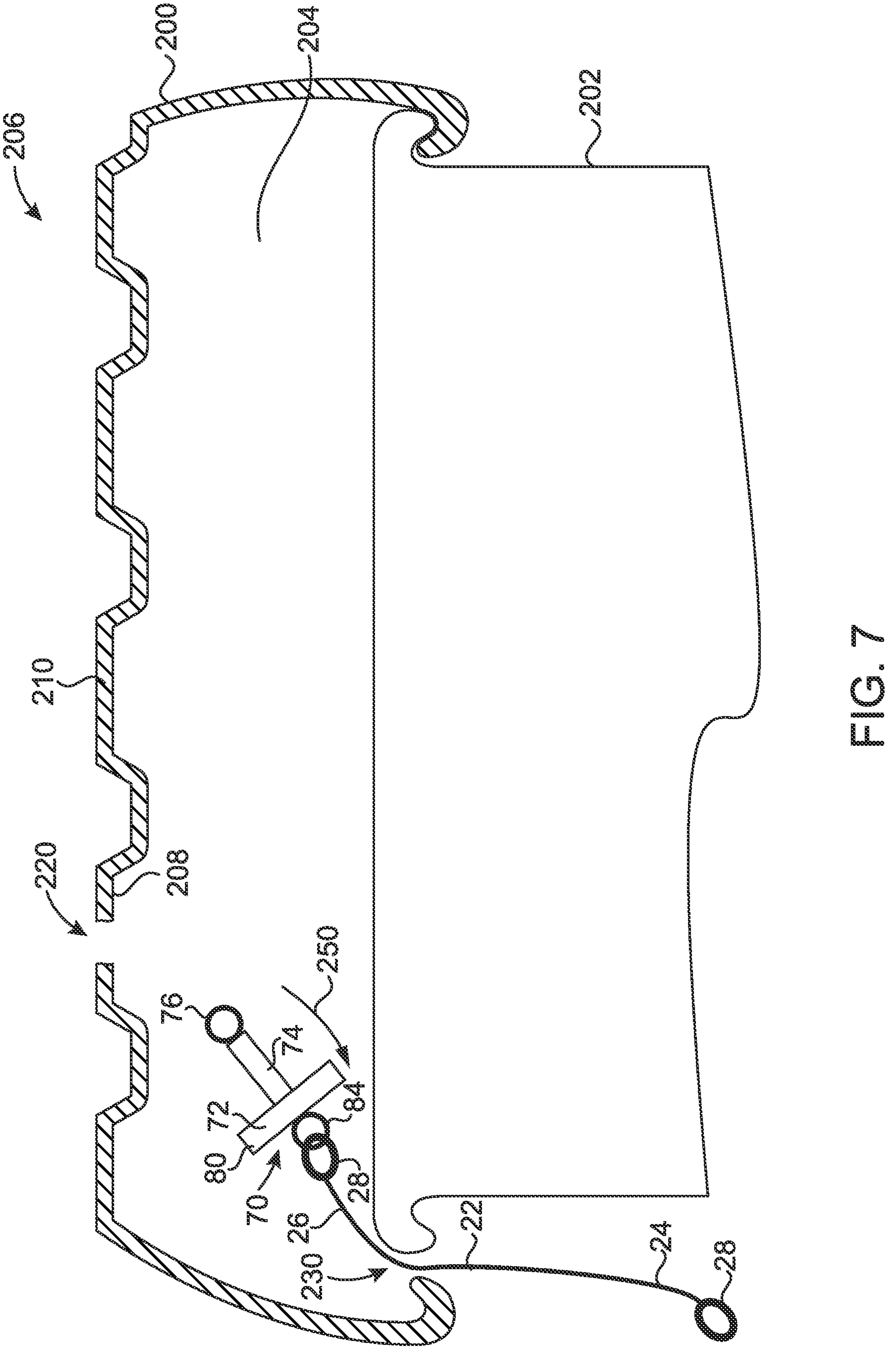
FIG. 7 illustrates the second cable being pulled to remove the surface prep component from the interior of the tire through the opening between the tire and the rim.

At this stage, the first cable 12 is removable from the prep stem 74 of the surface prep component 70. The prep stem 74 is then coupled to an actuator, as described above, while the prep stem 74 is positioned in the puncture 220. The actuator moves the surface prep component 70 to move the abrasive material 80 of the prep base 72 along the inner surface 208 of the interior 204 of the tire 200. In some embodiments, movement of the prep base 72 includes rotation, vibration side to side, vibration up and down, vibration circumferentially, and/or any variable movement of the prep base 72. Movement of the prep base 72 causes the abrasive material 80 to smooth the inner surface 208 of the interior 204 of the tire 200, for example, by smoothing the fragments 222 of tire material around the puncture 220. During movement of the prep base 72, the second cable 22 swivels relative to the prep base 72 of the surface prep component 70 on swivel attachment 84. FIG. 7 illustrates the second cable 22 being pulled in the direction 250 to remove the surface prep component 70 from the interior 204 of the tire 200 through the opening 230 between the tire 200 and the rim 202.

Figure 8:
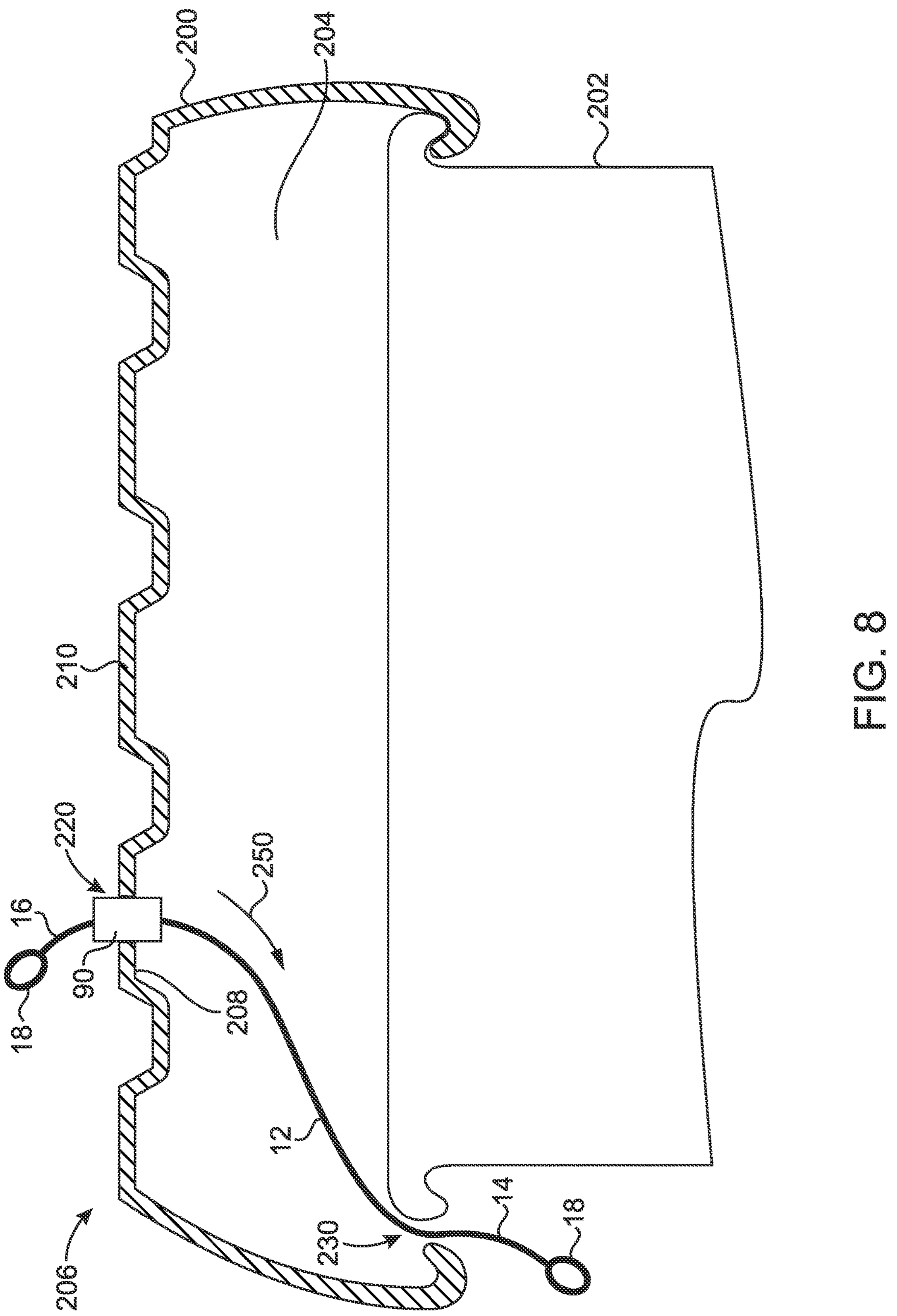
FIG. 8 illustrates the first cable reinserted through the cable insert tube and through the opening between the tire and the rim.
Figure 9:
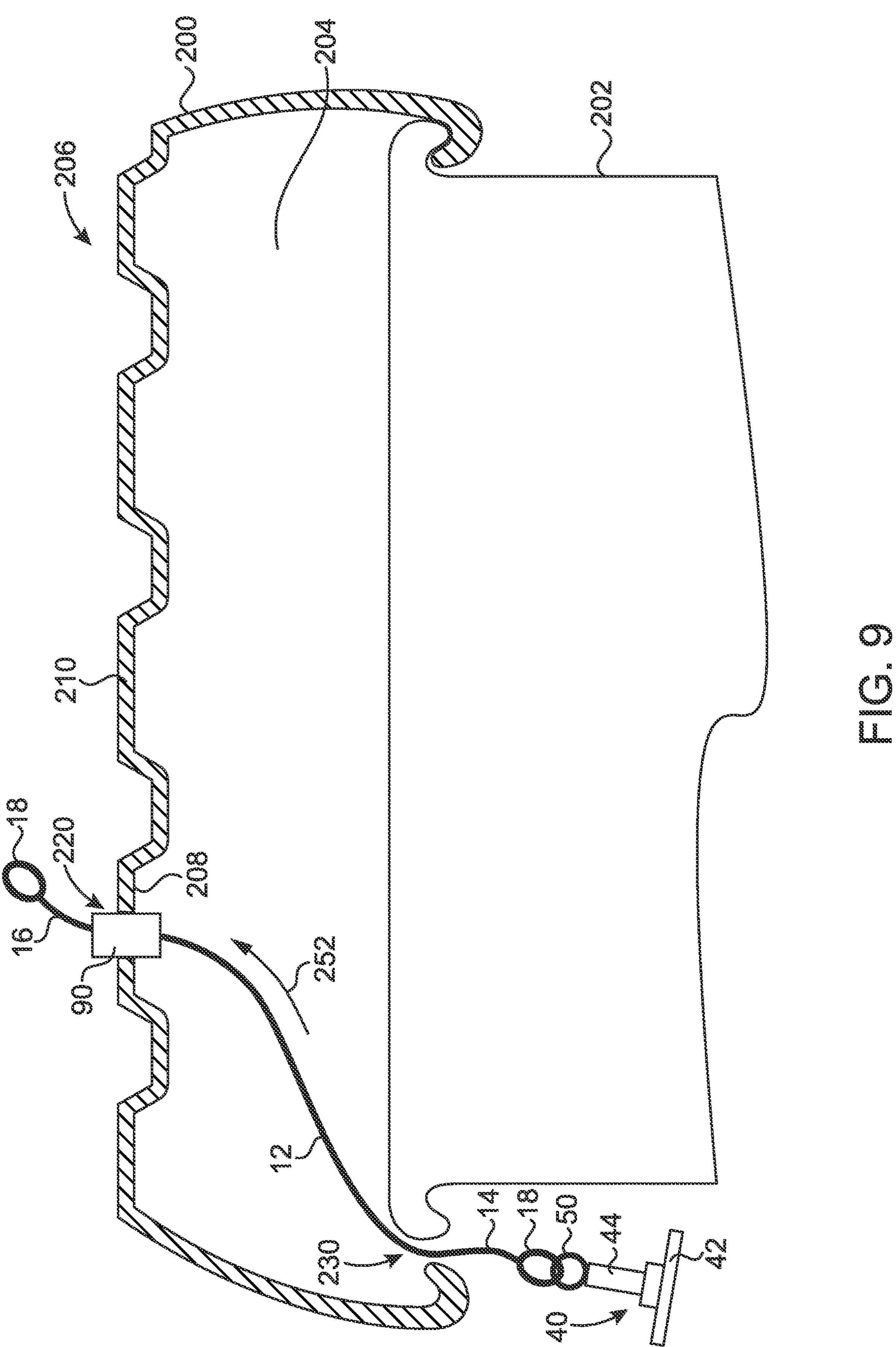
FIG. 9 illustrates a plug coupled to the first end of the first cable and the first cable being pulled through the puncture to move the plug through the interior of the tire and toward the puncture.

Referring to FIG. 8, the first cable 12 is reinserted through the cable insert tube 90 and through the opening 230 between the tire 200 and the rim 202, as described above with respect to FIG. 4. FIG. 9 illustrates the plug 40 coupled to the first end 14 of the first cable 12 using the attachment mechanism 50 on the plug stem 44 and the attachment mechanism 18 on the first cable 12. The first cable 12 is pulled in the direction 252 through the puncture 220 to move the plug 40 through the interior 204 of the tire 200 and toward the puncture 220. The second end 16 of the first cable 12 is movable in the direction 252 to cause the first cable 12 to move through the puncture 220 to pull the plug 40 into the interior 204 of the tire 200 through the opening 230 between the tire 200 and the rim 202. In some embodiments, the attachment mechanism 112 of the handle 110 is attached to the attachment mechanism 18 at the second end 16 of the first cable 12 so the handle 110 is usable to assist in moving the first cable 12 through the puncture 220.

Figure 10:
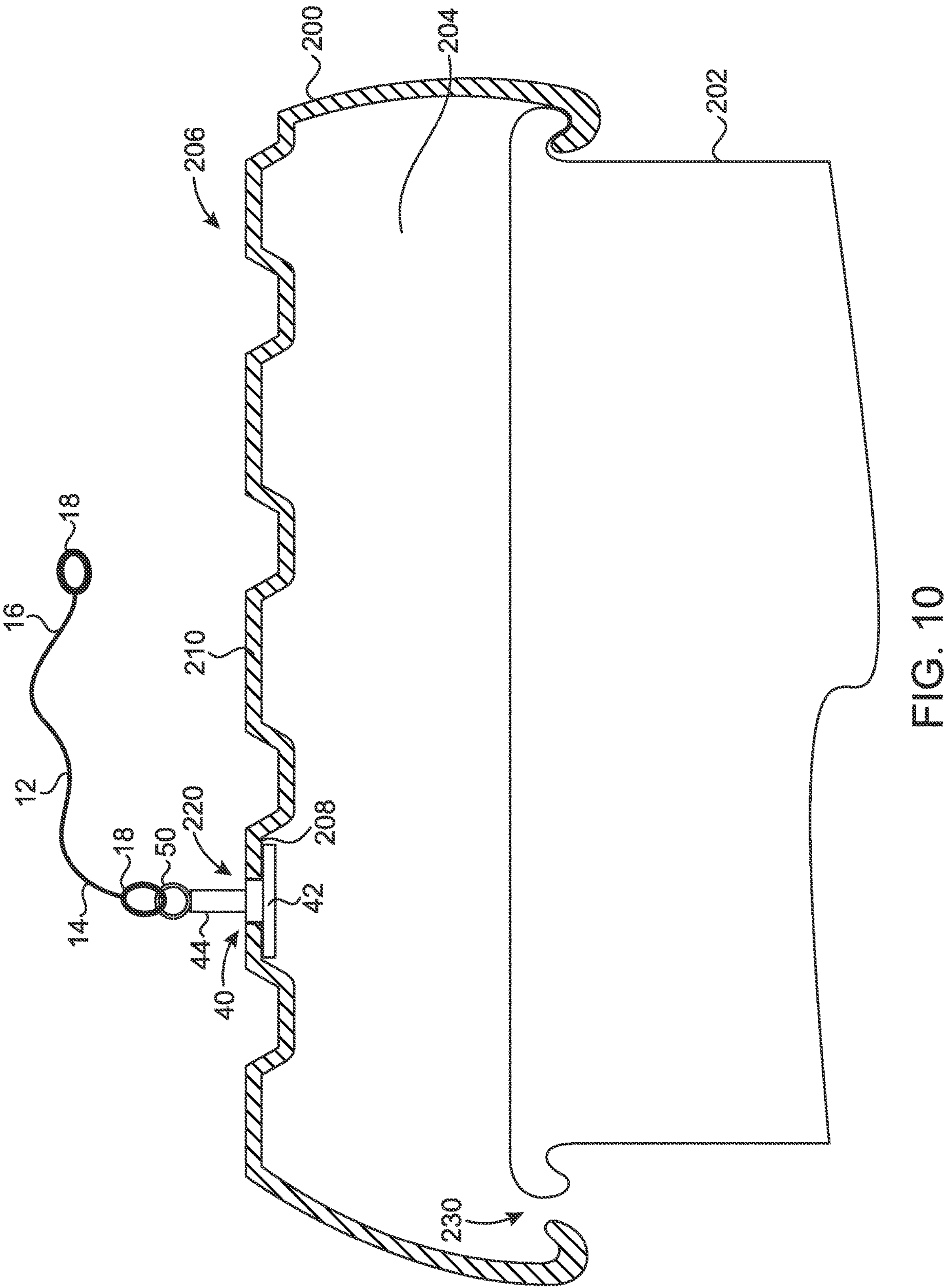
FIG. 10 illustrates a plug stem of the plug pulled through the cable insert tube by pulling the second end of the first cable.
Figure 11:
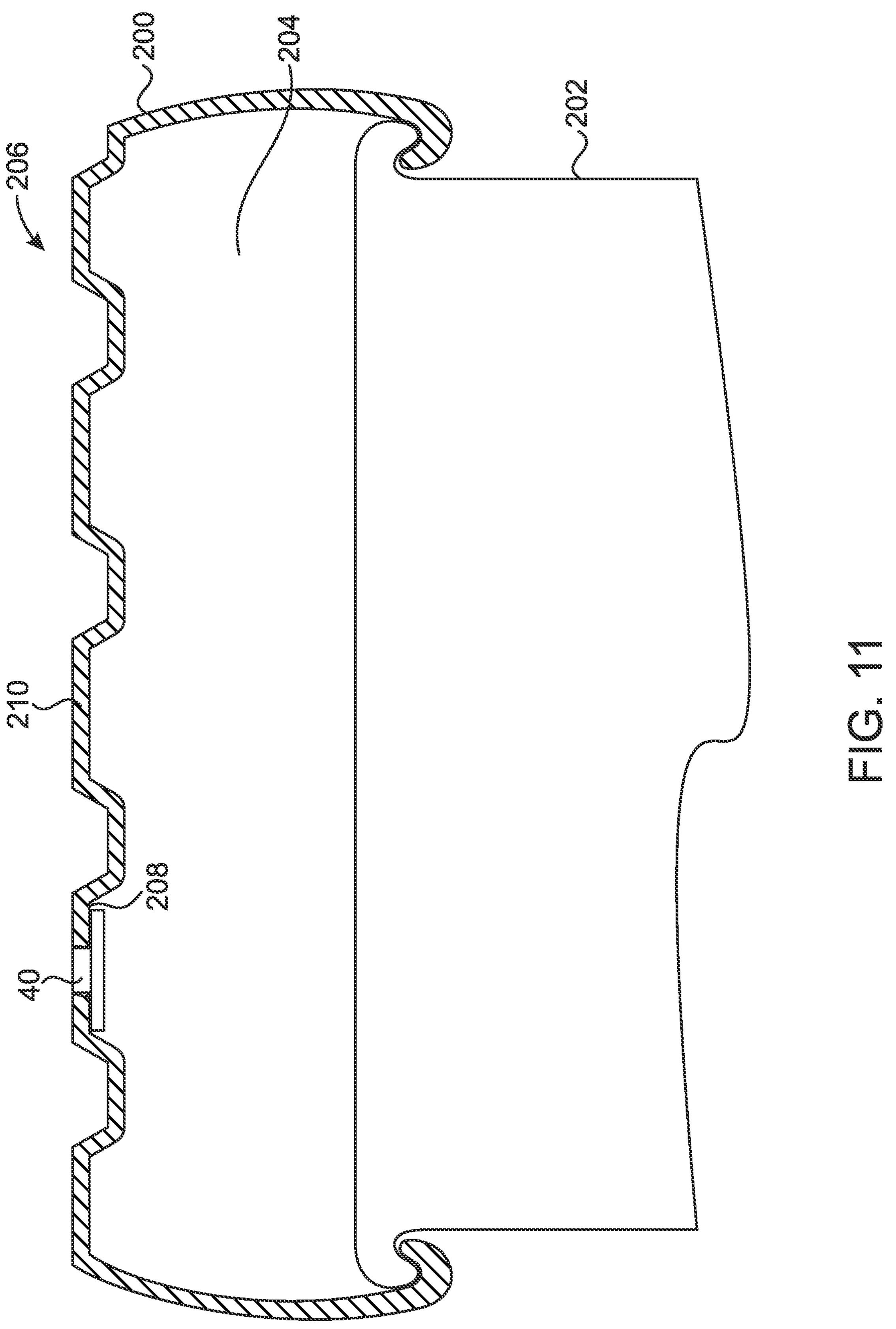
FIG. 11 illustrates the first cable removed from the plug and the cable insert tube removed from the puncture to secured the plug stem of the plug in the puncture with a plug base of the plug substantially flush against the inner surface of the tire.

FIG. 10 illustrates the plug stem 44 of the plug 40 pulled through the cable insert tube 90 by pulling the second end 14 of the first cable 12 in the direction 252. That is, the second end 14 of the cable 12 is movable in the direction 252 so that the plug stem 44 is pulled from the interior 204 of the tire 200 toward the exterior 206 of the tire 200 and into the puncture 220 and the plug base 42 positions against the inner surface 208 of the interior 204 of the tire 200 to patch the puncture 220. In some embodiments, the plug base 42 is adhered to the inner surface 208 of the interior 204 of the tire 200 with the adhesive material 46. FIG. 11 illustrates the first cable 12 removed from the plug 40 and the cable insert tube 90 removed from the puncture 220 to secure the plug stem 44 of the plug 40 in the puncture with a plug base 42 of the plug 40 substantially flush against the inner surface 208 of the tire 200. The cable insert tube 90 is removable from the puncture 220 while the plug stem 44 remains positioned in the puncture 220. The attachment mechanism 50 is removed from the plug stem 44. In some embodiments, excess material on the plug stem 44 extending exterior of the tire 200 is removed. The tire 200 is reseated on the rim 202 to close the opening 230.

Figure 12:
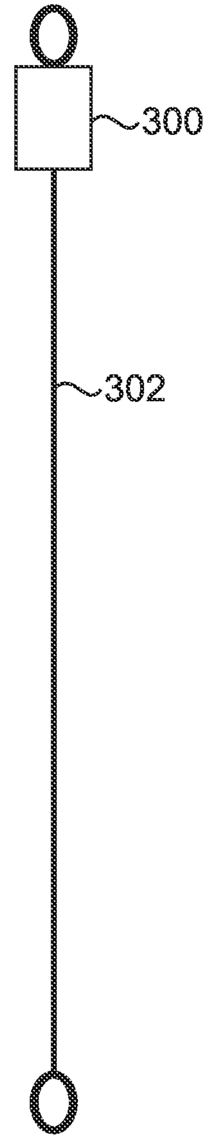
FIG. 12 illustrates a camera that is configured to inspect the inner surface of the interior of the tire.

Referring to FIG. 12, in some embodiments, the kit 10 includes a camera 300 that is configured to inspect the inner surface 208 of the interior 204 of the tire 200 before the plug 40 is positioned in the puncture 220. For example, in one embodiment, the camera 300 is used to determine whether the fragments 222 of tire material have been removed from the inner surface 208 of the interior 204 of the tire 200. In other embodiments, the camera 300 is used to determine whether the inner surface 208 of the interior 204 of the tire 200 is smooth. In some embodiments, the camera 300 is a wireless camera, for example, a Bluetooth camera. In an exemplary embodiment, the camera 300 is positioned on an end of a cable 302. In some embodiments, the cable 302 is an additional cable included in the kit 10. In other embodiments, the cable 302 is one of the first cable 12 or the second cable 22. The camera 300 is configured to be inserted into the interior 204 of the tire 200 through one of the puncture 220 or the opening 230 between the tire 200 and the rim 202.

Figure 13:
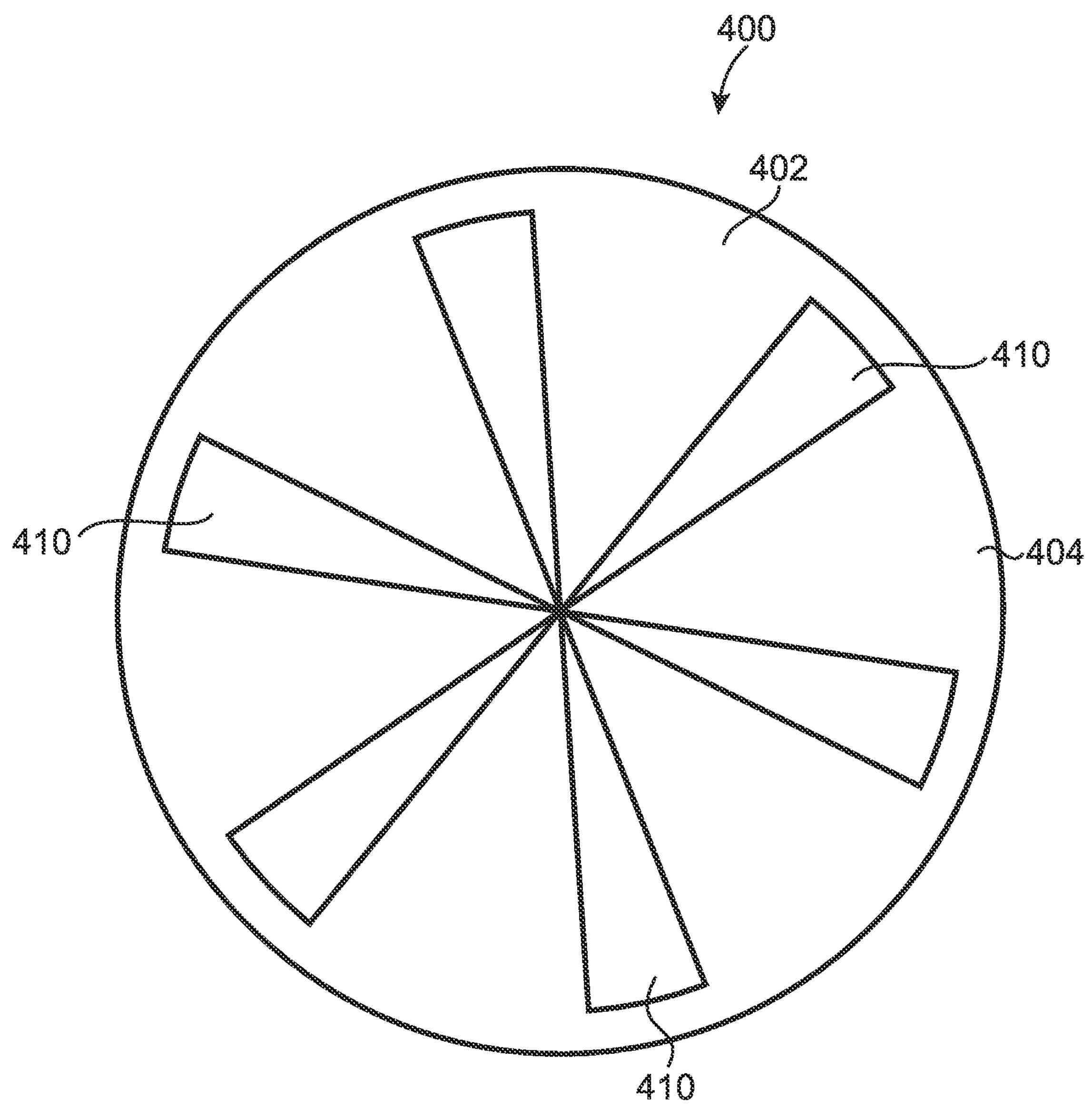
FIG. 13 illustrates a bottom view of a plug base having flanges on a bottom surface.

Referring to FIG. 13, in some embodiments, a plug 400 includes a plug base 402 having flanges 410 formed on a bottom surface 404. The flanges are configured to provide rigidity to the plug base 402 so that the plug base 402 rest flush against the inner surface 208 of the interior 204 of the tire 200 when the plug 400 is pulled into position in the puncture 220. In an exemplary embodiment, the flanges 410 extend radially outward from a center 412 of the plug base 402 to an outer perimeter 414 of the plug base 402. The flanges 410 are configured to extend any distance between the center 412 of the plug base 402 and the outer perimeter 414 of the plug base 402. In some embodiments, the flanges 410 increase in thickness from the center 412 of the plug base 402 to the outer perimeter 414 of the plug base 402. It will be appreciated, that the flanges 410 are arrangeable in any suitable configuration to provide rigidity to the plug base 402 including a grid or a spiral. Additionally, the plug base 402 or any of the plug bases described herein can have any suitable shape or size for securing to the inner surface 208 of the interior 204 of the tire 200.

Referring to FIG. 14, a compression system 500 is configured to apply pressure to a plug 550 to assist in adhering the plug 550 to the inner surface 208 of the interior 204 of the tire 200, wherein the plug 550 includes a loop 552 formed from any flexible material that extends from a bottom surface 554 of a plug base 556. It should be appreciated that the plug is any of the plug bases described herein. The plug 550 also includes a plug stem 558 extending from the plug base 556. The compression system 500 includes a compression cable 502 extending between a first end 504 and a second end 506. The second end 506 of the compression cable 502 includes a releasable clamp 508 that is configured to secure to the loop 552 of the plug 550. An actuating mechanism 510 is configured to actuate the clamp 508 between an open position and a closed position to secure the clamp 508 around the loop 552 when the clamp 508 is in the closed position.

A compression block 520 is formed from any suitable material capable of providing compression to the plug base 556. The compression block has an aperture 522 therethrough to receive the compression cable 502. The compression block 520 is configured to move along the compression cable 502 as the compression cable 502 slides through the aperture 522. A cinching mechanism 524 slides along the compression cable 502 to lock a position of the compression block 520 relative to the compression cable 502. A release 526 releases the cinching mechanism 524 so that the compression block 520 moves freely relative to the compression cable 502. The compression block 520 includes a bore 530 that receives the loop 552 when the compression block 520 is positioned adjacent the plug base 556. In an exemplary embodiment, the bore 530 is narrower than the loop 552.

Referring to FIG. 15, with the clamp 508 secured to the loop 552, the compression cable 502 is moveable in the direction 250 to stretch the loop 552 from its original configuration (shown as 510 in dashed lines) into the bore 530. The tension on the cable 502 is then released as shown in FIG. 16 to secure the compression block 520 against the plug base 556 by expanding the loop 552 against surfaces 532 of the bore 530 of the compression block 520 to secure the compression block 520 to the plug base 556. Concurrently, the cinching mechanism 524 is slid against the compression block 520 to hold the compression block 520 in place against the plug base 556.

Figure 17:
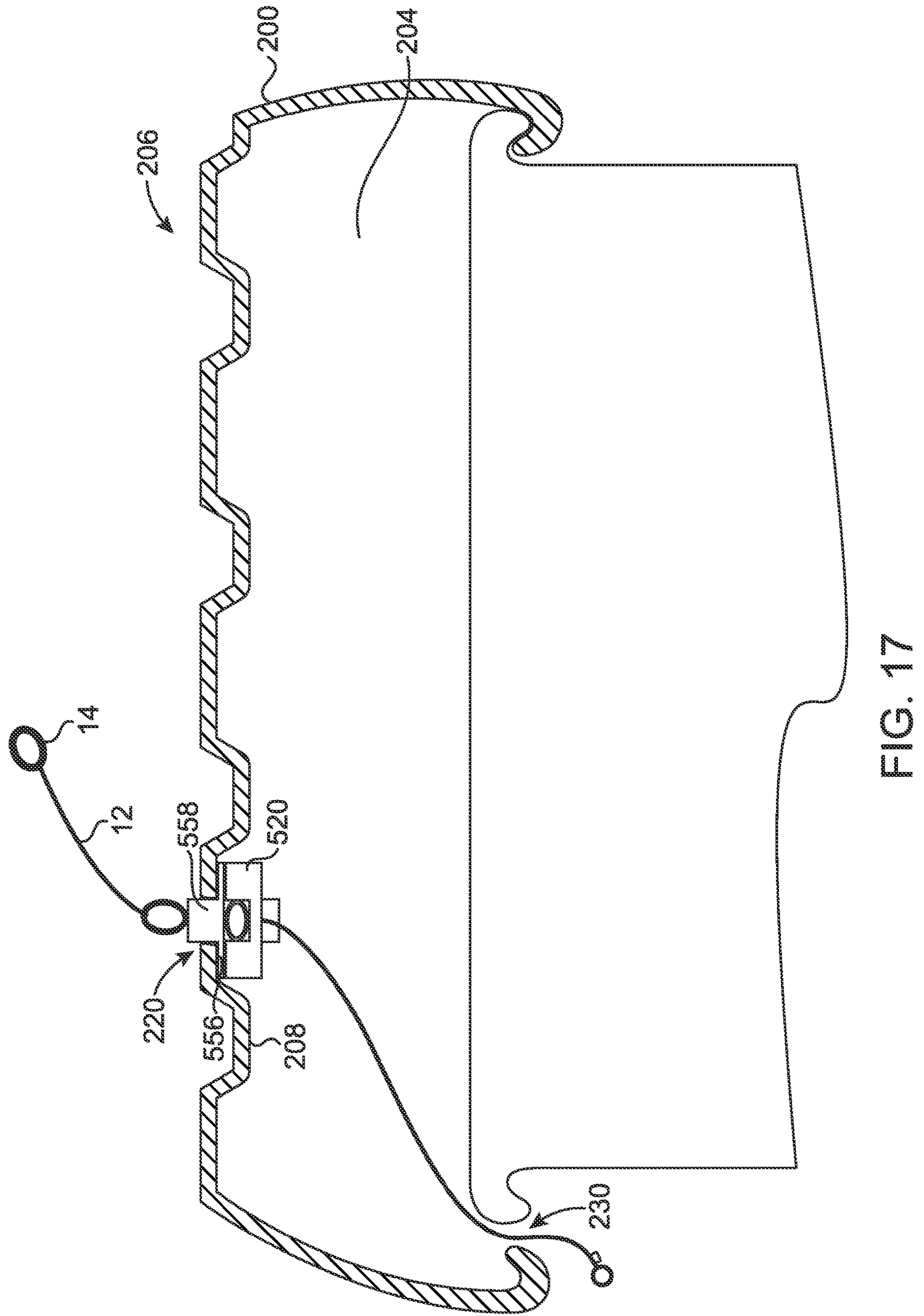
FIG. 17 illustrates the compression system utilized to secure the plug base to the inner surface of the interior of the tire.

Referring to FIG. 17, the second end 14 of the first cable 12 is then movable so that the plug stem 558 is pulled from the interior 204 of the tire 200 toward the exterior 206 of the tire 200 and into the puncture 220 and the plug base 556 positions against the inner surface 208 of the interior 204 of the tire 200 while the compression block 520 compressed against the inner surface 208 to secure the plug base 556 flush with the inner surface 208 of the interior 204 of the tire 200. The clamp 508 is then actuated to release the compression cable 502 from the loop 552. The compression block 520 is also released from the plug base 556 in response to actuating the clamp 508. The compression block 520 and the compression cable 502 are removable from the interior 204 of the tire 200 after the plug 500 is secured to the tire 200 by pulling the compression cable 502 through the opening 230.

Figure 18:
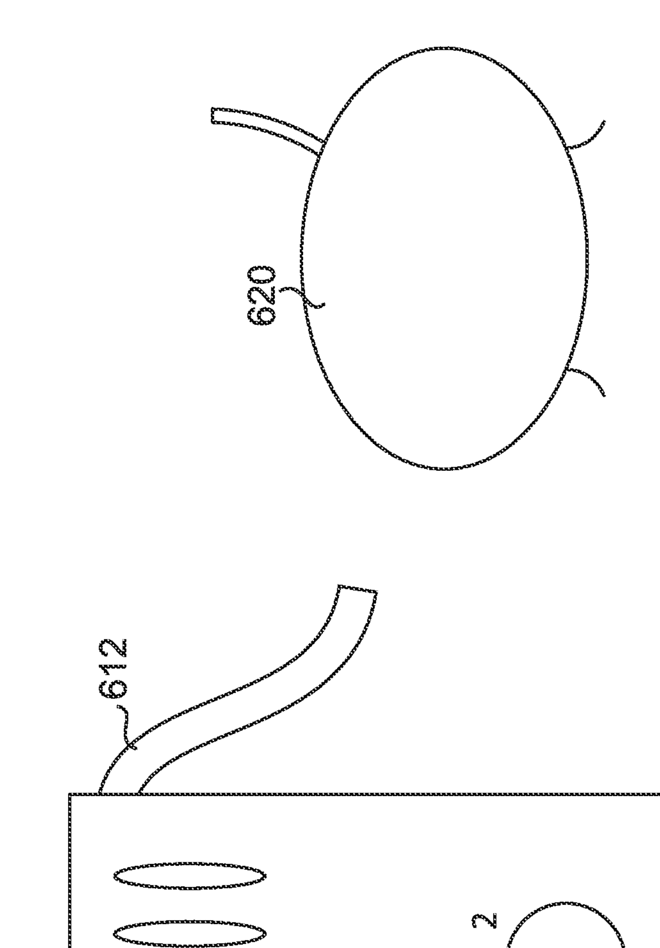
FIG. 18 illustrates various add-ons to the kit shown in FIG. 1.
Figure 18:
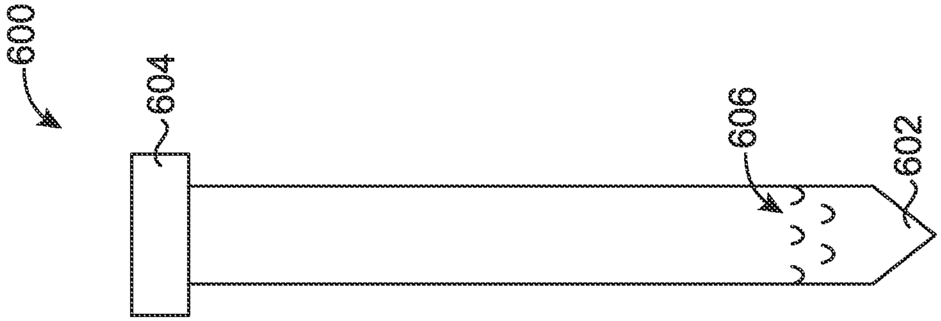

Referring to FIG. 18, the kit 10 includes a high pressure air bore tool 600, in some embodiments. The bore tool 600 includes an insertion end 602 and a hose end 604. The hose end 604 couples to a source of high pressure air. The insertion end 602 is configured to be inserted directly into the puncture 210. The insertion end 602 includes openings 606 that direct the high pressure air towards the hose end 604 of the bore tool 600. That is, the high pressure air is directed backward or in a reverse flow direction 608. Accordingly, when the insertion end 602 is positioned in the puncture 210, the high pressure air is directed back toward the inner surface 208 of the interior 204 of the tire 200 to clean debris from the inner surface 208 and prep the inner surface 208 for receiving one of the patches described herein. An air pump 610 is configured to provide various pressures of air. In a first setting, the air pump 610 provides air at a pressure lower than the high pressure air to fill the tire 200 after the tire 200 has been patched. When using the air pump 610 in the first setting, a hose 612 that attaches to the valve of the tire 200 is connected to the air pump 610. In a second setting, the air pump 610 is coupled to the high pressure air bore tool 600 to provide high pressure as described above. Alternatively, the high pressure air bore tool 600 is coupled to a source of compressed air 620 to provided high pressure as described above.

During use, the bore tool 600 is used to prepare the puncture 210 for patching by preparing and cleaning the inner surface 208 of the interior 204 of the tire 200 via high pressure or compressed air. The cable insert tube 90 is then used to insert the first cable 12 into the tire 200 for attachment to the surface prep component 70 to further prep the inner surface 208 of the interior 204 of the tire 200 as needed via the drill fitting through hollow portion of the cable insert tube 90. The cable insert tube 90 is then used with first cable 12 to attach to one of the plugs described herein for pulling the plug up into position for patching the tire 200. The plug is prepared with vulcanizing glue and the compression block 520 to patch the tire 200. The compression block 520 is then released and removes with the compression cable 502 from tire 200.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless cannot be necessary and embodiments lacking the same can be contemplated as within the scope of the disclosure, that scope being defined by the claims that follow.

In reading the claims it is intended that when words such as "a," "an," "at least one," "at least a portion" are used there is no intention to limit the claim to only one item unless specifically stated to the contrary in the claim. When the language "at least a portion" and/or "a portion" is used, the item can include a portion and/or the entire item unless specifically stated to the contrary. It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations can be apparent to those skilled in the art. Also, while multiple inventive aspects and principles have been presented, they need not be utilized in combination, and many combinations of aspects and principles are possible in light of the various embodiments provided above.

The invention claimed is:

1. A tire patching kit for patching a tire positioned on a rim, wherein the tire has an interior and an exterior, the kit comprising:

a plug cable having a first end and a second end, wherein the plug cable is sized and shaped to extend through the tire such that the first end of the plug cable is configured to extend through a puncture in the tire and to extend through an opening formed between the tire and the rim without removing the tire from the rim, and wherein at least a portion of the second end is configured to remain exterior to the puncture when the first end of the cable has extended through the puncture, a plug having a plug stem that is sized and shaped to be positioned in the puncture, wherein the plug has a plug base extending from the plug stem and configured to position against an interior surface of the tire, wherein the plug stem is attachable to the first end of the plug cable, a compression block configured to apply pressure against the plug base, and a compression cable that attaches to the plug base, wherein the compression cable is moveable to secure the compression block against the plug base, wherein the second end of the plug cable is movable to cause the plug cable to move through the puncture to pull the plug into the interior of the tire through the opening between the tire and the rim, and wherein the second end of the plug cable is movable so that the plug stem is pulled from the interior of the tire toward the exterior of the tire into the puncture while the compression block secures the plug base flush with the inner surface of the tire.

2. The kit of claim 1, further comprising a cinching mechanism to hold the compression block in place against the plug base.

3. The kit of claim 1, wherein the compression cable attaches to a loop coupled to the plug base.

4. The kit of claim 3, wherein the compression cable is movable to expand the loop against a bore of the compression block to secure the compression block to the plug base.

5. The kit of claim 3, wherein the compression cable includes a releasable clamp that secures to the loop.

6. The kit of claim 5, wherein the clamp is actuated to release the compression cable from the loop, wherein the compression block is released from the plug base in response to actuating the clamp.

7. The kit of claim 6, wherein the compression block and the compression cable are removable from the interior of the tire after the plug is secured to the tire to seal the puncture.

8. The kit of claim 1, further comprising a camera to inspect the interior of the tire.

9. The kit of claim 8, further comprising a camera cable, wherein the camera is attached to an end of the camera cable.

10. The kit of claim 8, wherein the camera is attached to at least one of the first end and the second end of the plug cable.

* * * * *